United States Patent [19]
Biermann et al.

[11] 3,861,828
[45] Jan. 21, 1975

[54] AIRCRAFT PROPELLER AND VIBRATION DAMPER ASSEMBLY

[75] Inventors: David Biermann; Richard V. Grimes, both of Piqua, Ohio; Gilbert D. Howe, Vandalia, Ohio; E. Forest Critchlow, Addison, Pa.

[73] Assignee: Hartzell Propeller, Inc., Piqua, Ohio

[22] Filed: May 2, 1973

[21] Appl. No.: 356,590

[52] U.S. Cl....................... 416/145, 416/500, 74/574
[51] Int. Cl............................................... B64c 11/02
[58] Field of Search....... 416/144, 145, 500; 74/574

[56] References Cited
UNITED STATES PATENTS

| | | | |
|---|---|---|---|
| 1,701,518 | 2/1929 | Walker | 74/574 |
| 1,838,023 | 12/1931 | Manville | 74/574 |
| 1,962,746 | 6/1934 | Lee | 74/574 |
| 1,965,742 | 7/1934 | Junkers | 416/500 X |
| 1,984,577 | 12/1934 | Griswold | 74/574 |
| 2,041,507 | 5/1936 | Zeder | 416/500 X |
| 2,236,139 | 3/1941 | Hutchison | 416/500 X |
| 2,440,956 | 5/1948 | Kearns et al. | 416/500 X |
| 2,580,839 | 1/1952 | Riopelle | 74/574 |
| 2,669,130 | 2/1954 | Shell | 74/574 |

*Primary Examiner*—Everette A. Powell, Jr.
*Attorney, Agent, or Firm*—Jacox & Meckstroth

[57] ABSTRACT

An annular weight member is positioned concentrically with an aircraft propeller and is supported by a plurality of circumferentially spaced fasteners which extend axially through corresponding resilient bushings confined within holes formed within the weight member. The fasteners are secured to a support member which is rigidly connected to the aircraft engine shaft, and a friction pad is compressed between the weight member and the support member by a set of compression springs mounted on the fasteners. In one embodiment, the support member consists of an annular plate rigidly secured to the propeller hub, and in another embodiment, the support member consists of the starter ring gear for the engine. A further embodiment shows the weight member supported by an outwardly projecting flange of the starter gear hub and also functioning as the starter ring gear for the engine.

8 Claims, 4 Drawing Figures

PATENTED JAN 21 1975 3,861,828

3,861,828

AIRCRAFT PROPELLER AND VIBRATION DAMPER ASSEMBLY

BACKGROUND OF THE INVENTION

In the use of a variable pitch aircraft propeller, for example, as disclosed in U.S. Biermann Pats. No. 3,115,937 and No. 3,380,535 which issued to the assignee of the present invention, it is not uncommon for the aircraft engine shaft to produce high frequency angular vibrations which are transferred to the blades of the propeller through the propeller hub rigidly secured to the shaft causing the blade tips to vibrate at the same frequency. Furthermore, if the amplitude of blade tip vibration exceeds a certain value, the bending stresses within the blades will exceed the fatigue limit of the blade material, resulting in fatigue failure of the blade.

There has been a number of devices either constructed or proposed for dampening the vibrations of an aircraft engine shaft so that the vibrations are not transferred to the propeller blades. For example, U.S. Pats. No. 2,225,929 and No. 2,495,565 each disclose a vibration absorber or damper for an aircraft propeller, and U.S. Pats. No. 2,440,956 and No. 2,464,773 disclose systems for dampening vibrations between tandem mounted multi-blade aircraft propellers. Another form of aircraft propeller incorporating a vibration dampening system is disclosed in U.S. Pat. No. 2,144,428. In the construction of any form of dampening system for an aircraft propeller, it is desirable for the system to be simple, economical and dependable in construction in addition to being effective in absorbing vibrational energy from the engine shaft and minimizing the transfer of vibrations to the propeller blades.

SUMMARY OF THE INVENTION

The present invention is directed to an improved aircraft propeller and damper assembly which provides the above mentioned desirable features. In addition, the damper system of the invention is ideally suited for absorbing the energy produced by high frequency vibration of the engine shaft, for example, the twelfth order vibrations or the vibrations having a frequency equal to about twelve times the rpm of the engine shaft and propeller. The damper system of the invention is also adapted to be conveniently installed on an aircraft propeller and minimizes the weight required to absorb vibrational energy so that the vibrations transmitted to the propeller blades are substantially reduced.

In one illustrated embodiment of the invention, an annular ring or weight member surrounds the propeller hub and is concentrically supported for slight rotation by resilient bushings which are confined within holes within the weight member and are mounted on threaded fasteners rigidly secured to an annular radial mounting plate fastened to the propeller hub. An annular friction pad is compressed between the weight member and the mounting plate by a series of compression springs mounted on the support fasteners. In another embodiment, the annular weight member is supported in a similar manner by the starter ring gear for the engine, and in a further embodiment, the annular weight member also functions as the starter ring gear and is similarly supported by a flange of the starter gear hub.

Other features and advantages of the invention will be apparent from the following description, the accompanying drawing and the appended claims.

IN THE DRAWING

DESCRIPTION OF THE PREFERRED EMBODIMENTS

Figure 1:
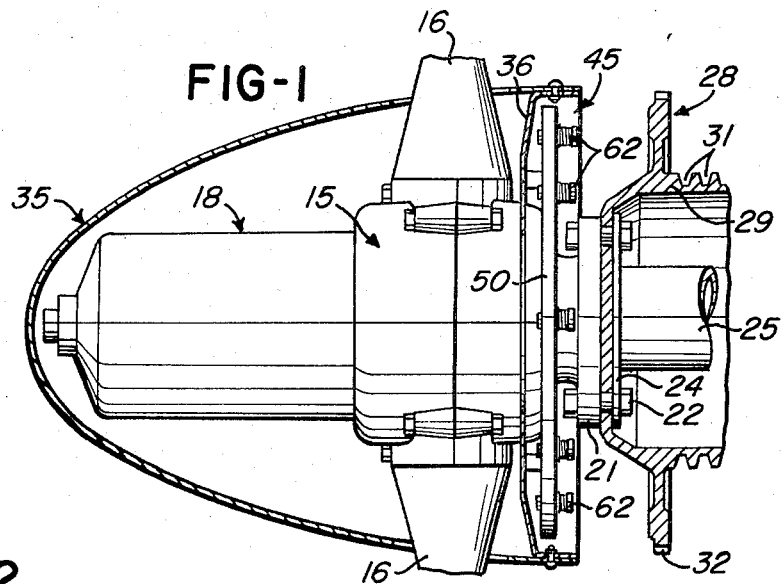
FIG. 1 is a fragmentary elevational view of an aircraft propeller and damper assembly, with a spinner dome and starter ring gear shown in axial section.

The aircraft propeller generally shown in FIG. 1 includes a metal propeller hub 15 which supports a set of outwardly projecting metal blades 16 in a manner, for example, as disclosed in above mentioned U.S. Pat. No. 3,380,535. The pitch of the blades 16 is controlled by operation of a fluid cylinder unit 18 which projects axially from the propeller hub 15 and is well known in the art. The hub 15 includes an outwardly projecting radial flange 21 which is rigidly secured by a set of peripherally spaced machine screws 22 to a radial flange 24 projecting outwardly from the forward end of the aircraft engine shaft 25.

Figure 2:
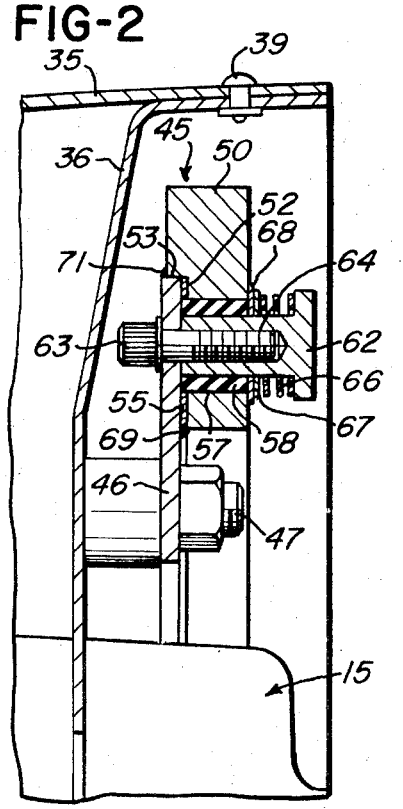
FIG. 2 is an enlarged fragmentary axial section of the damper assembly shown in FIG. 1.

A starter ring gear 28 is clamped between the propeller hub flange 21 and the engine shaft flange 24 and includes a generally cylindrical hub 29 having a set of circumferential grooves 31 for receiving corrresponding V-belts. Peripherally spaced gear teeth 32 extend around the starter ring gear 28 and are adapted to engage a pinion (not shown) mounted on the shaft of the starter motor. The propeller hub 15 and fluid actuating cylinder unit 18 are enclosed by a spinner dome 35 which is supported by an annular spinner bulkhead 36 having an inner radial portion rigidly secured to the propeller hub by a set of screws (not shown). The spinner bulkhead 36 also includes a rearwardly projecting flange portion 38 (FIG. 2) which is rigidly secured to the rearward annular portion of the spinner dome 35 by a series of circumferentially spaced rivets 39.

In accordance with the present invention, an annular vibration damper assembly 45 surrounds the propeller hub 15 between the spinner bulkhead 36 and the hub mounting flange 21. The damper assembly 45 includes an annular mounting plate 46 which has an inner radial portion rigidly secured to the propeller hub 15 by circumferentially spaced threaded fasteners or screws 47. The outer radial portion of the plate 46 supports a weight ring or an anuular weight member 50 which has a counterbore or annular inner recess defined by a radial surface 52 and a cylindrical surface 53. The surface 53 closely surrounds the outer cylindrical surface of the mounting plate 46, but with sufficient clearance to provide for slight rotation of the weight member 50. In one installation which provided highly satisfactory results, the weight member 50 had a weight of about 6 pounds.

A thin annular friction disc or pad 55 is confined between the mounting plate 46 and the radial surface 52 of the weight member 50 and is preferably formed of a phenolic material. The friction pad 55 and the weight member 50 have a series of circumferentially spaced and axially extending cylindrical bores or holes 57 which receive a corresponding series of resilient cylindrical grommets or bushings 58. Preferably, each of the bushings 58 is formed of a silicone rubber-like material and has a durometer of approximately 40 to 90.

A hex head spacer tube or fitting 62 extends through each of the bushings 58 and is rigidly secured to the mounting plate 46 by a socket head fastener or screw 63 which is threaded into a hole 64 formed within each of the fittings 62. The head portion of each of the fittings 62 projects rearwardly from the rear surface of the weight member 50 and retains a flat wire coil compression spring 66, a metal washer 67 and a non-metallic friction washer 68. The springs 66 exert a substantial force against the weight member 50, tending to compress the annular friction pad 55 between the weight member and the mounting plate 46. The resiliency of the bushings 58 permits the weight member 50 to rotate a few thousandths of an inch from a normal position relative to the annular plate 46. A set of inner and outer annular flexible seals 69 and 71, respectively, (FIG. 2) of silicone rubber material, form fluid-tight seals between the mounting plate 46 and weight member 50 to protect the friction pad 55 from exposure to moisture.

When the aircraft propeller is being driven by the engine shaft 25 at a certain operating speed, for example, 2400 rpm, it has been found that the damper assembly 45 is effective in absorbing the high frequency twelfth order angular vibrations being transmitted from the engine shaft to the propeller. That is, the combination of the support of the weight member 50 by the fittings 62 and resilient bushings 58 and the frictional draft effect produced by the compressed friction pad 55, cause the damper assembly 45 to absorb the angular vibrations of about 480 vibrations per second and thereby greatly reducing the 12th order vibrational energy received by the propeller blades 16. As a result, the stress on the blades 16 due to this frequency vibration, is substantially reduced or eliminated.

Figure 3:
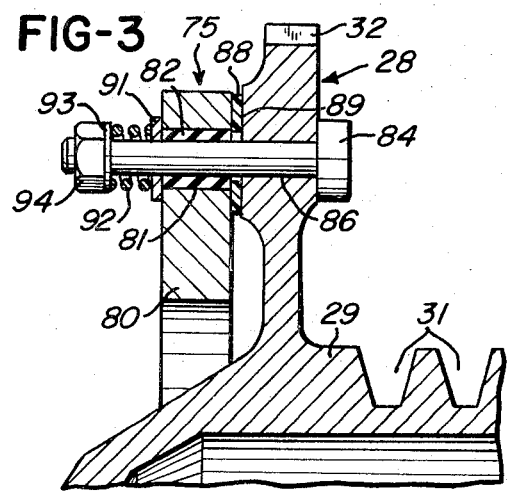
FIG. 3 is a fragmentary axial section similar to FIG. 2 and showing a modified form of damper assembly constructed in accordance with the invention.

Referring to FIG. 3 which shows a modification of the invention, a damper assembly 75 is supported directly by a starter ring gear 28. The damper assembly 75 includes an annular weight member 80 which has a rectangular cross-sectional configuration and is constructed substantially the same as the weight member 50 referred to above in connection with FIG. 2. The weight member 80 includes a plurality of circumferentially spaced cylindrical cores or holes 81 which receive corresponding resilient silicone grommets or bushings 82. Each of the bushings 82 receives a corresponding socket head screw 84 which extends through a corresponding axially aligned hole 86 formed within the starter ring gear 28.

An annular disc-like friction pad 88 of non-metallic material, is positioned between the weight member 80 and a front radial surface 89 of the starter gear 28. A washer 91 and a compression spring 92 are mounted on each of the screws 84 and are retained by a washer 93 and a nut 94. The nuts 94 are tightened so that the springs 92 press the weight member 80 towards the ring gear 28 and thereby compress the friction pad 88 therebetween. The operation of the damper assembly 75 is the same as the operation of the damper assembly 45. However, since the annular mounting plate 46 is eliminated, the total weight of the damper assembly 75 is less than that of the assembly 45. It is to be understood that the screws 84, springs 92, washers 91 and 93 and nuts 94 may be replaced by the preferred form of mounting and fastener assemblies shown in FIG. 2 without affecting the operation of the damper assembly.

Figure 4:
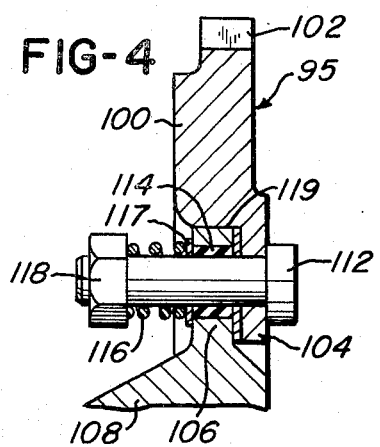
FIG. 4 is a fragmentary axial section similar to FIG. 3 and illustrating another modified form of damper assembly constructed in accordance with the invention.

Another embodiment or modification of the invention is shown in FIG. 4. In this modification, a damper assembly 95 includes a weight ring or annular weight member 100 with peripherally spaced gear teeth 102, and also functions as a part of a starter ring gear. The weight member 100 includes an inwardly projecting and circumferentially extending radial flange 104 which overlaps an outwardly projecting and circumferentially extending radial flange 106 formed as an integral part of the starter ring gear hub 108. An annular disc-like phenolic friction pad 110 is sandwiched between the flanges 104 and 106 and is compressed between the flanges by a series of circumferentially spaced screws 112 which extend through corresponding resilient bushings 114 confined within holes formed within the flange 106. The screws 112 received corresponding compression springs 116, washers 117 and nuts 118 in the same manner as described above for the embodiment as shown in FIG. 3.

The weight member 100 has an inner cylindrical surface 119 which receives the outer cylindrical surface of the flange 106 to assure the concentricity of the weight member 100 when it rotates slightly relative on the starter gear hub 108. As mentioned above, the weight member 100 serves dual functions. That is, it cooperates with the friction pad 110, screws 112, the resilient bushings 114 and springs 116 to absorb or dampen the high frequency vibration energy produced by the engine shaft 25. In addition, the weight member 100 serves as the starter ring gear and thereby eliminates the need for having the mass of a vibration dampening weight member in addition to the mass of the starter ring gear, as required in the embodiments shown in FIGS. 1–3.

From the drawing and the above description, it is apparent that an aircraft propeller incorporating a vibration damper system constructed in accordance with the present invention, provides desirable features and advantages. For example, each of the damper assemblies is simple and economical in construction and is positively retained so that the assembly will provide long and dependable maintenance-free service. While the damper assemblies illustrated are particularly adapted for dampening high frequency vibrations, such as the twelfth order vibrations, the mass of the annular weight members, the resiliency of the grommets or bushings supporting the weight member, and the forces exerted by the compression springs, may be selectively modified or adjusted for dampening vibrations of higher or lower frequency produced by the engine shaft.

Furthermore, while the forms of damper systems herein described constitute preferred embodiments of the invention, it is to be understood that the invention is not limited to these precise forms of apparatus, and that changes may be made therein without departing from the scope and spirit of the invention as set forth in the appended claims.

The invention having thus been described, the following is claimed:

1. An aircraft propeller assembly, comprising a propeller hub including an outwardly projecting radial flange, a plurality of propeller blades projecting generally radially outwardly from said hub, means for rigidly connecting said radial flange of said hub to the shaft of an aircraft engine, an annular weight member concentrically surrounding said propeller hub and positioned at an axial location between said blades and said radial flange, a radially disposed annular support plate, means for securing the inner portion of said plate to said propeller hub, a plurality of circumferentially spaced and axially extending openings within said annular weight member, a fastener projecting through each of said openings and secured to the outer portion of said support plate, a resilient bushing disposed within each of said openings and mounted on the corresponding said fastener for supporting said weight member for slight angular movement relative to said propeller hub in response to sensing vibrational energy from the engine shaft, a friction pad positioned between said support plate and said weight member, and a set of springs mounted on said fasteners and positioned to urge said weight member towards said support plate, for substantially eliminating the transfer of vibrations from the aircraft engine shaft to said propeller blades.

2. An aircraft propeller assembly, comprising a propeller hub including an outwardly projecting radial flange, a plurality of propeller blades projecting generally radially outwardly from said hub, means for rigidly connecting said radial flange of said hub to the shaft of an aircraft engine, an annular weight member concentrically surrounding said propeller hub and positioned at an axial location between said blades and said radial flange, said weight member having an annular recess defined by an inner cylindrical surface and a radial surface, a radially disposed annular support plate disposed within said recess and having an outer cylindrical surface of substantially the same diameter as said inner surface of said recess, means for securing the inner portion of said plate to said propeller hub, a plurality of circumferentially spaced and axially extending openings within said annular weight member, a fastener projecting through each of said openings and secured to the outer portion of said support plate, a resilient bushing disposed within each of said openings and mounted on the corresponding said fastener for supporting said weight member for slight angular movement relative to said propeller hub in response to sensing vibrational energy from the engine shaft, a friction pad positioned within said recess between said support plate and said weight member, and a set of springs mounted on said fasteners and positioned to urge said weight member towards said support plate for substantially eliminating the transfer of vibrations from the aircraft engine shaft to said propeller blades.

3. An aircraft propeller assembly, comprising a propeller hub including an outwardly projecting radial flange, a plurality of propeller blades projecting generally radially outwardly from said hub, means for rigidly connecting said radial flange of said hub to the shaft of an aircraft engine, an annular weight member concentrically surrounding said propeller hub and positioned at an axial location between said blades and said radial flange, said weight member having an annular recess defined by an inner cylindrical surface and a radial surface, a radially disposed annular support plate disposed within said recess and having an outer cylindrical surface of substantially the same diameter as said inner surface of said recess, means for securing the inner portion of said plate to said propeller hub, a plurality of circumferentially spaced and axially extending openings within said annular weight member, a fastener projecting through each of said openings and secured to the outer portion of said support plate, a resilient bushing disposed within each of said openings and mounted on the corresponding said fastener for supporting said weight member for slight angular movement relative to said propeller hub in response to sensing vibrational energy from the engine shaft, a friction pad positioned within said recess between said support plate and said weight member, a set of annular resilient seals adjacent said recess and connecting said support plate to said weight member to form a fluid-tight enclosure for said friction pad, and a set of springs mounted on said fasteners and positioned to urge said weight member towards said support plate for substantially eliminating the transfer of vibrations from the aircraft engine shaft to said propeller blades.

4. An aircraft propeller assembly as defined in claim 1 including a dome-shaped spinner housing surrounding said propeller hub, an annular bulkhead wall secured to said hub between said blades and said support plate, and said bulkhead wall includes a generally cylindrical outer portion surrounding said weight member and secured to a surrounding portion of said spinner housing.

5. An aircraft propeller assembly as defined in claim 2 wherein each of said fasteners comprises a spacer member having a head portion and an internally threaded bore, a screw extending through said support plate into said bore to secure said spacer member to said support plate, and the corresponding said spring is disposed between said head portion of said fastener and said weight member.

6. An aircraft propeller as defined in claim 1 wherein each of said fasteners comprises a headed spacer member having an internally threaded bore, and a screw extending into said bore and rigidly securing said spacer member to said mounting plate.

7. An aircraft propeller as defined in claim 1 wherein said weight member includes means defining a circumferential recess, and said mounting plate is annular and seats within said recess.

8. An aircraft propeller as defined in claim 1 including flexible seal means between said weight member and said mounting plate and cooperating therewith to form a fluid-tight enclosure for said friction pad.

* * * * *